United States Patent [19]
Crowe

[11] 4,227,396
[45] Oct. 14, 1980

[54] CONTOURED STAMPING DIE

[75] Inventor: John J. Crowe, Williamsville, N.Y.

[73] Assignee: Union Carbide Corporation, New York, N.Y.

[21] Appl. No.: 11,674

[22] Filed: Feb. 12, 1979

[51] Int. Cl.³ .................. B21J 13/02; B21D 37/00
[52] U.S. Cl. .................................... 72/469; 72/476; 72/478
[58] Field of Search ............... 72/352, 358, 360, 385, 72/412, 469, 470, 476, 478; 76/101 R, 107 R

[56] References Cited

U.S. PATENT DOCUMENTS

| | | | |
|---|---|---|---|
| 1,920,699 | 8/1933 | Hurley | 76/107 R |
| 2,165,008 | 7/1939 | Rosenberg | 76/107 R X |
| 2,440,963 | 5/1948 | Luce | 76/107 R |
| 2,552,455 | 5/1951 | Pond | 76/107 R X |
| 3,100,411 | 8/1963 | Airlie | 83/138 |
| 3,151,504 | 10/1964 | Pare et al. | 76/107 R |
| 3,498,158 | 3/1970 | Kougel | 76/107 R |
| 3,895,947 | 7/1975 | Sarka | 76/107 R X |
| 3,910,138 | 10/1975 | Sinha et al. | 76/107 C |
| 4,024,623 | 5/1977 | Kun | 76/107 R X |
| 4,133,227 | 1/1979 | Crowe et al. | 76/107 R |

*Primary Examiner*—Ervin M. Combs
*Attorney, Agent, or Firm*—Steven J. Hultquist

[57] ABSTRACT

A method for manufacturing a contoured die wherein a workpiece is formed with depressions extending across the top surface of the workpiece from front to back thereof. The depressions are formed spaced apart from one another to retain flat top surface portions therebetween. Smoothly contoured edge surfaces are then formed on the workpiece in the regions of intersection of the top surface with the front and back surfaces, to produce a die with ridge projections surrounded by top surface portions having a concave elevational contour as viewed in a vertical plane perpendicular to the side surfaces of the workpiece.

14 Claims, 24 Drawing Figures

CONTOURED STAMPING DIE

BACKGROUND OF THE INVENTION

1. Field of the Invention

This invention relates to method for forming a contoured die suitable for stamping heat exchange channel element wall members from thin sheet metal, and to the contoured die produced thereby.

2. Description of the Prior Art

A number of industrial heat exchange applications have created a demand for lightweight, inexpensive heat exchangers formed from thin-walled heat exchange channel elements. In U.S. Pat. No. 3,757,856 to L. C. Kun, a lightweight, potentially inexpensive heat exchange channel element is disclosed which can be used to fabricate a heat exchanger of exceptional strength and excellent heat transfer performance characteristics. The Kun heat exchanger comprises an array of parallel channels formed of thin heat conductive walls which have on their surface osostress contours with uniformly disposed unidirectional wall-supporting projections formed from the wall.

U.S. Pat. No. 4,024,623 to L. C. Kun discloses a method of forming a stamping die with which heat exchange walls for channel elements of the above-mentioned type can be fabricated from thin sheet metal. This method involves the deformation of a flexible membrane into the desired isostress surface configuration by by pneumatic pressure differential across the membrane, with deposition and subsequent setting of a curable material on the deformed flexible membrane. The cured material having the isostress-contoured surface configuration is then ready to be used as a die.

An improvement to the pneumatically deformed membrane die-making method described above is disclosed in U.S. Pat. No. 4,133,227 to J. J. Crowe et al. This patent discloses method of fabricating a metal die having an isostress-contoured surface configuration by direct machining of a metal workpiece.

The isostress-contoured heat exchange surface produced by stamping thin sheet metal with dies manufactured in accordance with the foregoing methods, despite their high strength and heat transfer capability, have not yet been widely implemented in practice. A primary reason for this lack of implementation is the significant pressure drop which is associated with the heat transfer fluid flowed over the isostress-contoured surface, particularly when same is employed in a stacked channel element heat exchanger, e.g., automobile radiators. It has recently been determined that the substantial advantages of the isostress-contoured heat exchange surface can be retained while markedly reducing the external fluid medium pressure drop characteristic associated therewith by a heat exchange wall member having wall projection portions extending elongately on the wall member surface, with the elongated projections being oriented on the wall member surface substantially parallel to one another and with adjacent projections being separated by concavely curved wall surface portions. The surface of heat exchange wall members with such configuration is hereinafter referred to as a "ridge projection" surface.

Accordingly, it is an object of the present invention to provide a metal die suitable for stamping heat exchange wall members having a ridge projection wall surface from thin sheet metal, and to provide a method of fabricating such a die.

SUMMARY OF THE INVENTION

This invention is directed to a method for making a contoured die suitable for stamping heat exchange channel element wall members from thin sheet metal, and to a die manufactured thereby.

In accordance with the method of the invention, a workpiece is provided having a horizontally extending flat top surface, vertically extending side surfaces, and vertically extending front and back surfaces. Each of the side surfaces is parallel to the other side surface and perpendicular to the front and back surfaces, whereby the workpiece has a rectangular cross-section in plan view over its entire vertical extent.

Depressions are formed in the workpiece extending across the flat top surface from the front surface to the back surface parallel to the side surfaces of the workpiece. Adjacent depressions are spaced apart from one another to retain flat top surface portions therebetween of rectangular shape having a transverse dimension d as measured in a horizontal plane containing the flat top portions. The depressions are formed with a concave elevational contour of constant radius of curvature $R_1$ as viewed in a vertical plane perpendicular to the side surfaces of the workpiece. The forming step is carried out such that the dimensional ratio of the radius of curvature $R_1$ to the flat top surface portion transverse dimension d is between 0.375 and 30,000.

Smoothly contoured edge surfaces are formed on the workpiece in the regions of intersection of the top surface of the workpiece with the front and back surfaces thereof, including edge surface portions extending between and joining the front and back surfaces with the flat top surface portions. The edge surface portions each have an inwardly directed elevational contour from a lower extremity adjacent the front or back surface to an upper extremity adjacent the flat top surface portion, as viewed in a vertical plane parallel to the side surfaces of the workpiece and passing through the flat top surface portion.

In another aspect, the invention relates to a contoured metal die of block-like form having vertically extending side surfaces and vertically extending front and back surfaces. Each of the side surfaces is parallel to the other side surface and perpendicular to the front and back surfaces, whereby the die has a rectangular cross-section in plan view over its entire vertical extent. The die has a top surface comprising ridge projections extending elongately across the top surface parallel to the side surfaces of the die with flat top surface portions at the extremities of the ridge projections. The flat top surface portions have an aspect ratio $(d_2/d_1)$ of at least 10, wherein $d_2$ is the longitudinal dimension of the ridge projection flat surface portion as measured in a horizontal plane containing the flat top surface portions and $d_1$ is the transverse dimension of the ridge projection flat top surface portion as measured in the horizontal plane containing the flat top surface portions along a direction perpendicular to the side surfaces of the die. The flat top surface portions are surrounded by top surface portions having a concave elevational contour of constant radius of curvature $R_1$ as viewed in a vertical plane perpendicular to the side surfaces of the die, such that the dimensional ratio of the radius of curvature $R_1$ to the flat top surface portion transverse dimension d is between 0.375 and 30,000. The ridge projections have smoothly contoured edge surfaces between the top surface of the die and the front and back surfaces thereof, including edge surface portions extending between and joining the front and back surfaces with the flat top surface portions. Each of the edge surface portions has an inwardly directed elevational contour from a lower extremity adjacent the front or back surface to an upper extremity adjacent the flat top surface portion, as viewed in a vertical plane parallel to the side surfaces of the die and passing through the flat top surface portion.

DESCRIPTION OF THE PREFERRED EMBODIMENTS

Figure 1:
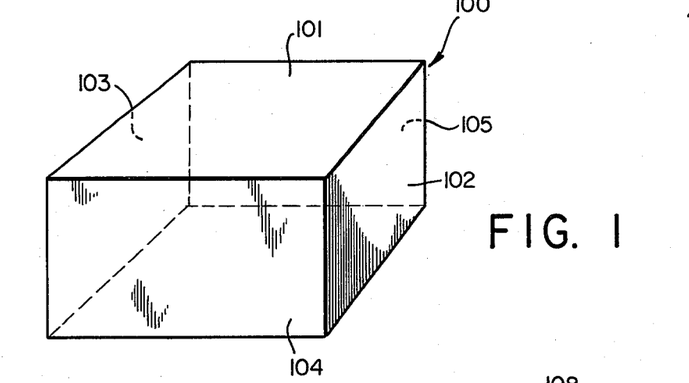
FIG. 1 is an isometric view of a workpiece for the method of the present invention.

Referring now to the drawings, FIG. 1 shows an isometric view of a workpiece 100 having a horizontally extending flat top surface 101, vertically extending side surfaces 102 and 103, and vertically extending front and back surfaces 104 and 105, respectively. Each of the side surfaces 102, 103 is parallel to the other surfaces and is perpendicular to the front and back surfaces 104 and 105, respectively, whereby the workpieces has a rectangular cross-section in plan view over its entire vertical extent.

Figure 2:
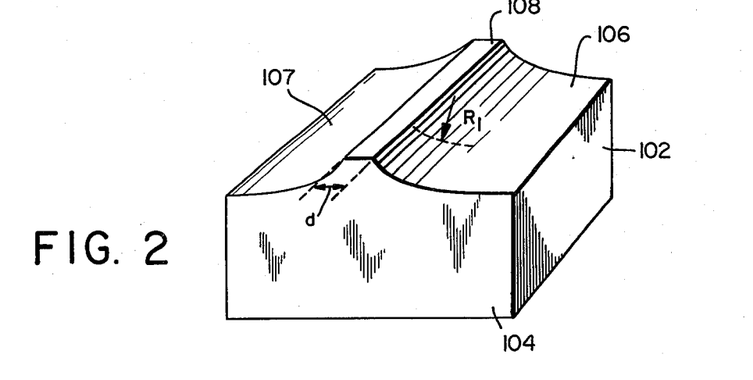
FIG. 2 is an isometric view of the FIG. 1 workpiece, after same had been subjected to an initial forming step.

FIG. 2 is an isometric view of the FIG. 1 workpiece, after the same has been subjected to an initial forming step to form depressions 106 and 107 in the workpiece extending across the flat top surface thereof from the front surface 104 to the back surface 105 parallel to the side surfaces 102, 103 of the workpiece. Such initial forming step may suitably be carried out by conventional machining methods employing end milling or form grinding tools, as described more fully hereinafter. As shown in FIG. 2, the adjacent depressions 106 and 107 are spaced apart from one another to retain flat top surface portion 108 therebetween of rectangular shape having a transverse dimension d as measured in a horizontal plane containing the flat top surface portion. The depressions are formed with a concave elevational contour of constant radius of curvature $R_1$ viewed in a vertical plane perpendicular to the side surfaces of the workpiece. The forming step is carried out such that the dimensional ratio of the radius of curvature $R_1$ to the flat top surface portion transverse dimension d is between 0.375 and 30,000, and preferably 4 and 500.

Figure 3:
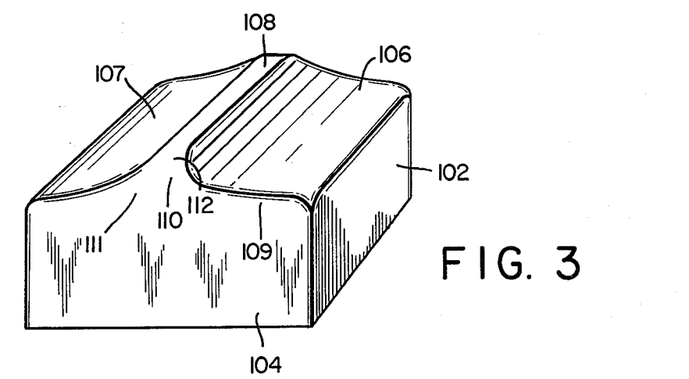
FIG. 3 is an isometric view of the FIG. 2 workpiece, after subjecting same to a subsequent edge surface forming step.

FIG. 3 is an isometric view of the FIG. 2 workpiece, after the same has been subjected to a further forming step of forming smoothly contoured edge surfaces 109 on the workpiece in the regions of intersection of the top surface of the workpiece with the front and back surfaces thereof, including edge surface portions 110 extending between and joining the front and back surfaces 104 and 105, respectively, with the flat top surface portion 108. The edge surface portions 110 each have an inwardly directed elevational contour from a lower extremity 111 adjacent the front or back surface to an upper extremity 112 adjacent the flat top surface portion 108, as viewed in a vertical plane parallel to the side surfaces 102, 103 of the workpiece and passing through the flat top surface portion 108.

In the method described above in connection with FIGS. 1–3, the workpiece 100 is formed to provide same with only a single flat top surface portion 108 surrounded on either side by depressions 106, 107 whose elevational contours terminate at the side surfaces 102, 103 such that a tangent to the elevational contour at its outermost extremity is perpendicular to the associated side surface. As used herein, the "elevational contour" of a specific die portion is the configurational profile of the surface portion as viewed in an elevational view in the specific plane identified therefor, as for example the depressions having a concave elevational contour as viewed in a vertical plane perpendicular to the side surfaces of the workpiece. The term "inwardly directed elevational contour from a lower extremity adjacent the front or back surface to an upper extremity adjacent the flat top surface portion" as used to describe the edge surface portions of the workpiece means that the upper extremity of the edge surface portion is farther away from the plane of the front surface 104 than is the lower extremity of the edge surface portion.

Figure 4:
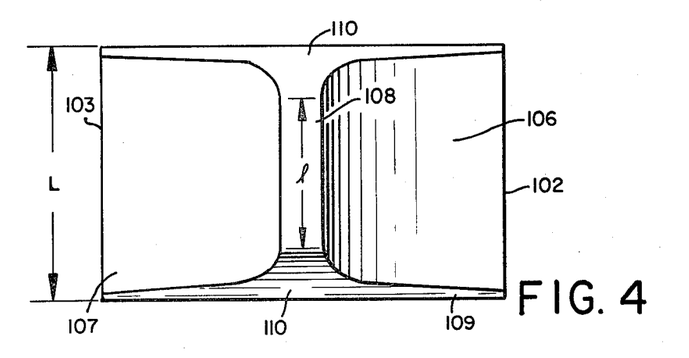
FIG. 4 is a plan view of the FIG. 3 workpiece.

FIG. 4 is a plan view of the FIG. 3 workpiece, showing the features thereof. The length of the side wall surfaces of the workpiece is denoted as the longitudinal dimension of the workpiece and is measured by dimension L in the drawing. As shown, the smoothly contoured edge surfaces 109 include edge surface portions 110 extending between and joining the front and back surfaces with the flat top surface portion 108. The longitudinal dimension of the flat top surface portion 108 is denoted l. In the preferred practice of the invention, the flat top surface portions 108 are formed with an aspect ratio (l/d) of at least 10, wherein d is the aforementioned transverse dimension of the flat top surface portion.

Figure 5:
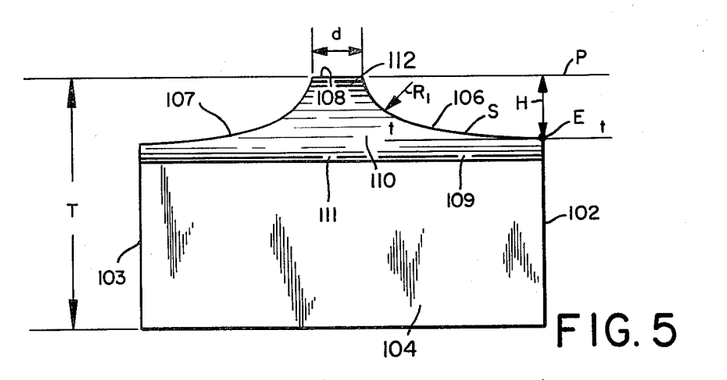
FIG. 5 is an elevational view of the FIG. 3 workpiece, as viewed at the front surface thereof.

FIG. 5 is an elevational view of the FIGS. 3-4 workpiece, showing the dimensional characteristics thereof. The flat top surface portion 108 of the die has a transverse dimension d as measured in a horizontal plane P containing the flat top surface portion. The concave surface portion (depression) 106 on the die top surface has an elevational contour as viewed in a vertical plane perpendicular to the side surfaces of the workpiece which terminates at the side surface, at point E, such that a tangent t-t to the elevational contour at its outermost extremity at point E is perpendicular to the associated side surface 102. In the general practice of the present invention, the workpiece may suitably comprise a steel block having a thickness T, as measured perpendicularly to the flat top surface of the workpiece of 0.5 to 2 inches.

Figure 6:
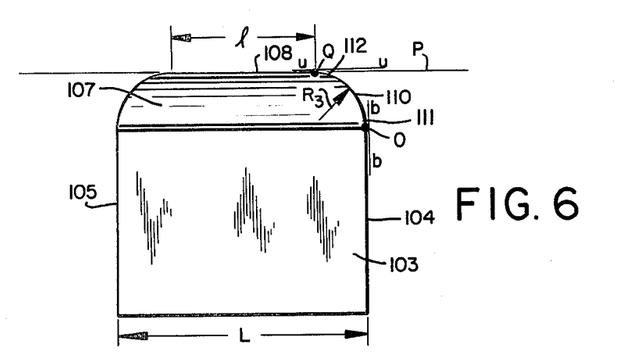
FIG. 6 is an elevational view of the FIG. 3 workpiece, as viewed at the side surface thereof.

FIG. 6 shows a side elevational view of the FIGS. 3-5 finished die workpiece. The flat top surface portion 108 has a longitudinal dimension l as measured in the horizontal plane P containing the flat top surface portion. In this embodiment, the edge surface portions 110 are formed with a continuously curving convex elevational contour. More specifically, the edge surface portion 110 in this embodiment has its lower extremity 111 adjacent the front (or back) surface of the workpiece being tangent to the front (or back) surface, as shown by the tangent b-b to the lower extremity of the edge surface portion 110 at point O. Likewise, the upper extremity 112 of the edge surface portion 110 adjacent the flat top surface portion 108 is tangent to the flat top surface portion, as shown by tangent U-U passing through point Q at the intersection of the edge surface portion and the flat top surface portion of the die.

In the preferred practice of the invention, the longitudinal dimension l of the flat top surface portion 108, as measured in the horizontal plane P containing the flat top surface portion, is at least 50% of the longitudinal dimension L of the workpiece, in order to accommodate the dimensional requirements of the heat exchange wall member which is stamped by the die in the preferred application for the article of this invention.

Figure 7:
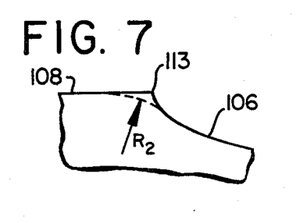
FIG. 7 is an elevational view of the ridge projection of the die, showing the surface contour obtained after a preferred finishing step.

FIG. 7 is an elevational view of the region of intersection of the concave surface portion 106 of the workpiece with the flat top surface portion 108 thereof, illustrating an optional further machining step in the practice of the invention. In this embodiment, the sharp edge 113 at the intersection of the flat top surface portion and the surrounding depression is reduced to impart to such edge a smoothly convexly curved elevational contour as viewed in a vertical plane perpendicular to the side surfaces of the workpiece. The elevational contour suitably has a convexly circular profile of constant radius of curvature $R_2$. In this connection, the flat top surface portion transverse dimension d is the transverse dimension of the flat top surface portion of the die workpiece subsequent to the initial depression forming step and the transverse dimension $d_1$, is the transverse dimension of the flat top surface portion of the manufactured die after the completion of all forming and finishing steps, including for example any desirable smoothing and finishing steps which may reduce the transverse dimension of the flat top surface portion to less than the value of the transverse dimension after the initial depression forming step.

Figure 8:
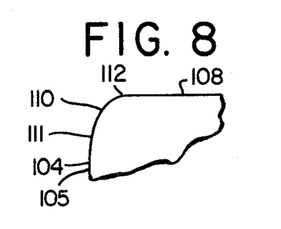
FIGS. 8–10 show various elevational contours for the edge surface portions of the ridge projection of the die.
Figure 9:
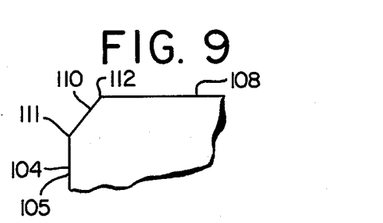
Figure 10:
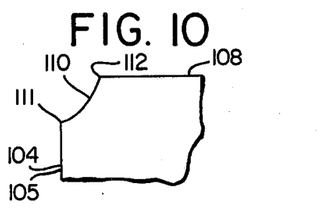

FIGS. 8-10 are elevational views of various configurations for the edge surface portions of the die interposed between the flat top surface portion 108 and the front or back surface 104, 105 of the die. The edge surface portion 110 has an upper extremity 112 and a lower extremity 111. In the FIG. 8 embodiment, the edge surface portion is formed with a continuously curving convex elevational contour. In the FIG. 9 embodiment, the edge surface portion is formed with a linear elevational contour and in FIG. 10, the edge surface portion is shown with a continuously curving concave elevational contour.

Figures 11A, 11B:
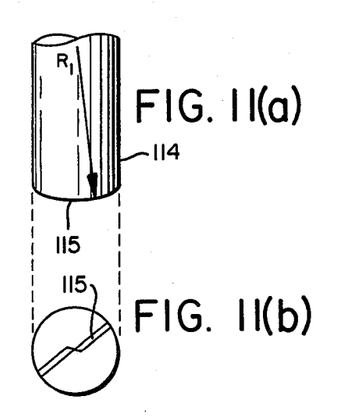
FIGS. 11(a) and 11(b) show side and bottom views of an end milling tool such as may be used to form the concave top surface portions of the die.
Figures 12A, 12B:
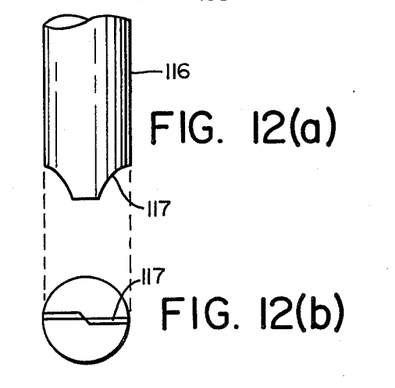
FIGS. 12(a) and 12(b) show side and bottom views of an end milling tool such as may be employed to form convexly contoured edge surfaces on the die.

FIGS. 11 and 12 show suitable end milling tools for carrying out the above-described forming steps of forming depressions and smoothly contoured edge surfaces on the workpiece. FIG. 11(a) shows an elevational view of an end milling tool for machining depressions in the workpiece. The tool 114 has a bottom cutting surface 115, shown in FIG. 11(b), of radius of curvature $R_1$. In practice, the depressions as shown in FIG. 2 may be machined by translation of the rotating milling tool 114 across the workpiece top surface, from the front to the back thereof. FIG. 12(a) shows an elevational view of an end milling tool 116 having a bottom cutting surface 117, shown in plan view in FIG. 12(b), which may suitably be employed to form the smoothly contoured edge surfaces on the workpiece as shown in FIG. 3 by translation of the rotating tool 116 across the edge regions of the workpiece proximate the upper extremities of the respective front and back surfaces of the workpiece.

Figure 13:
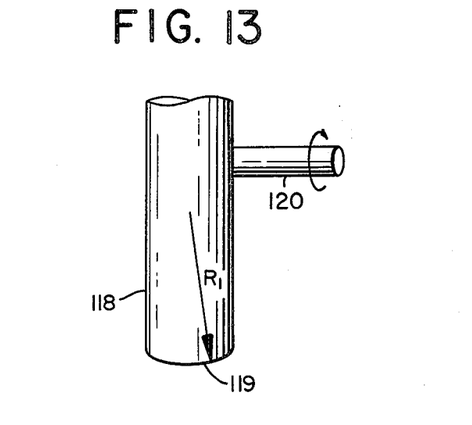
FIG. 13 is an elevational view of a form grinding tool such as may be employed to form the concave top surface portions of the die.
Figure 14:
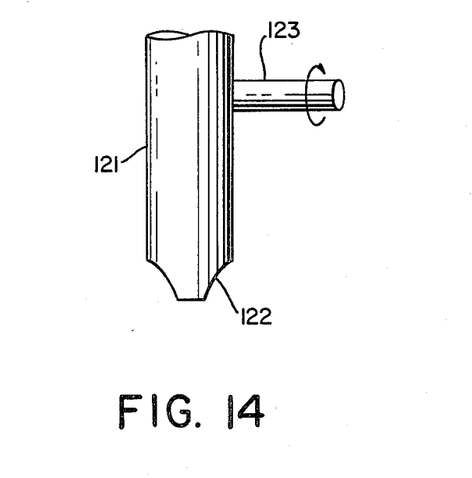
FIG. 14 is an elevational view of a form grinding tool of a type such as may be usefully employed to form convexly contoured edge surfaces on the die.

FIGS. 13 and 14 show form grinding tools which may suitably be employed to form the workpiece depressions and edge surfaces, as an alternative to the use of the end milling tools described immediately hereinabove. FIG. 13 is an elevational view of a form grinding tool having a cutting surface 119 of radius of curvature $R_1$, with the cutting surface being rotated at high speed by means of rotating shaft 120. The FIG. 13 tool may suitably be employed to machine depressions of constant radius of curvature $R_1$ in the initial workpiece forming step, while the tool 121 shown in FIG. 14 may be employed to machine the smoothly contoured edge surfaces on the workpiece in the subsequent forming step. As shown, form grinding tool 121 has a cutting surface 122 of the same contour as the desired surface profile of the edge surface, and this cutting surface is rotated at high speed for the cutting operation by rotating shaft 123. As an alternative to the use of the form grinding tool shown in FIG. 14, it may be desirable in some applications to provide a form grinding tool with a cutting surface arranged to concurrently form both smoothly contoured edge surfaces on the workpiece.

Although the depression and edge surface forming steps of the invention may suitably employ end milling or form grinding tools of the type described above, it will be recognized that it is possible to use other forming or machining means to carry out such steps, as for example an EDM milling machine or a numerically controlled milling machine. The various tools and techniques which may be employed in the broad practice of the method of forming the die of this invention are well known in the tool and die art, so that the previous description of illustrative forming tools is in no way to be construed as limiting as regarding the carrying out of the forming steps of this invention.

The further forming step described in connection with FIG. 7 of removing the sharp edge at the intersection of the flat top surface portion and the surrounding depression to impart to such edge a smoothly convexly contoured elevational contour as viewed in a vertical plane perpendicular to the side surfaces of the workpiece may suitably be carried out with a hand-held tool such as a stone or riffler. In addition to such optional finishing step, it may be desirable to subject the formed die element to an overall cleaning and polishing step. This may be done with any suitable means such as a polishing cloth or light abrasive buffing means to smooth all of the die top surface portions, i.e., flat top surface portions, edge surfaces and concave surface portions, to yield a highly polished die surface to enhance the suitability thereof for subsequent stamping operations using the finished die element.

Figure 15:
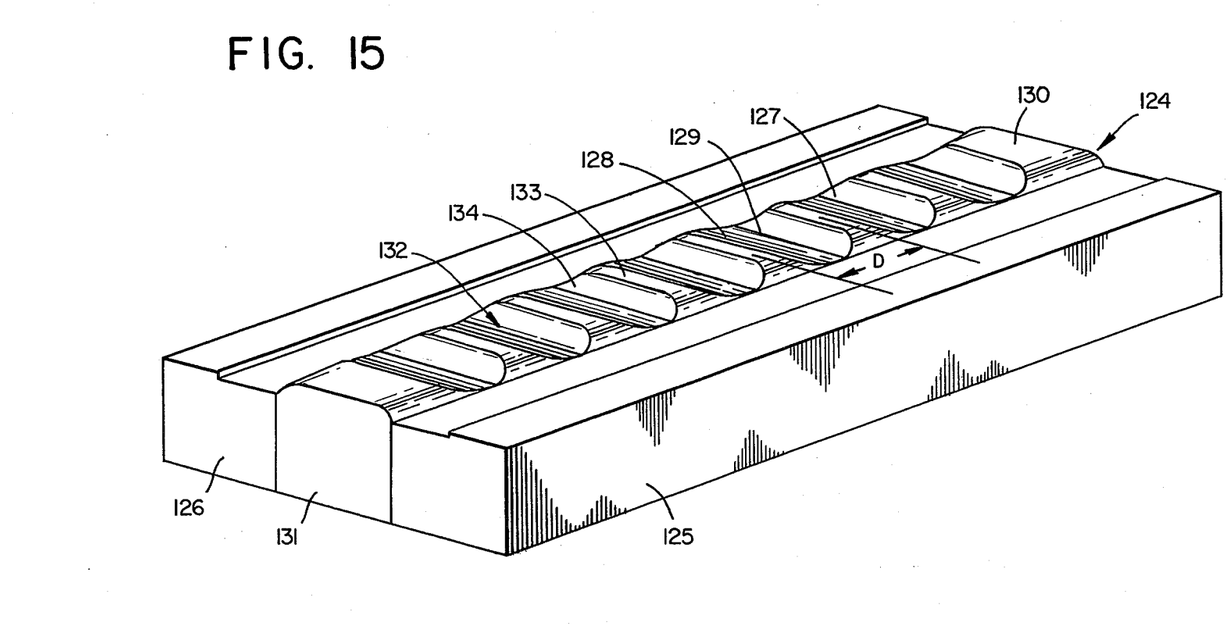
FIG. 15 is an isometric view of a contoured die according to the invention, made up of a plurality of die elements of the type shown in FIGS. 3–6.

FIG. 15 is an isometric view of a composite die formed from a plurality of workpiece die elements each formed as described in connection with FIGS. 1–6 herein. The die elements are disposed as shown in a longitudinally extending array of sequential die elements oriented with their front and back surfaces in alignment and with abuttment of facing side surfaces of adjacent die elements, as for example die elements 127 and 128 abutting along line 129. The array 124 is fixtured in position by fixture means 125 and 126 to provide a longitudinally undulating top die surface 132 of ridges 133 formed by the flat top surface portions of the die elements and interposed valleys 134 formed by mating depressions of adjacent die elements.

The die element forming steps involved in forming the die of FIG. 15 are carried out such that the relationship between the depression radius of curvature $R_1$, flat top surface portion transverse dimension d, depression depth H, and flat top surface portion spacing D is defined by $$R_1 = \frac{(D - d)^2}{8H} + \frac{H}{2}$$

wherein $R_1$ and d are as previously defined, H is the maximum height measured perpendicularly from a horizontal plane containing the flat top surface portions to the innermost point on the elevational contour of a depression between adjacent flat top surface portions (see FIG. 5), and D is the center-to-center spacing between adjacent flat top surface portions, as measured in a vertical plane perpendicular to the workpiece side surfaces. The dimension D is shown in FIG. 15 as being the transverse separation distance between adjacent ridges of the composite die. In the use of the die article of this invention as a stamping die for forming heat exchange wall members, suitable ranges for the above-described parameters are as follows: D between about 0.2 and 3.0 inch; H/D between about 0.05 and 0.5; and D/d between about 1.5 and 50. For the usage of the die article for stamping automobile radiator heat exchange wall members, H is preferably between about 0.035 and 0.80 inch, D is preferably between about 0.4 and 1.1 inch, and d is preferably between about 0.01 and 0.05 inch.

The reasons for these various dimensional values and parametric ranges is associated with the heat transfer and pressure drop requirements of the heat transfer wall member stamped using the die of this invention; the same considerations of heat transfer and pressure drop of the surface stamped using the die give rise to the previously mentioned requirement that the dimensional ratio of the radius of curvature $R_1$ of the concave top surface portions (depressions) of the die workpiece to the flat top surface portion transverse dimension d lie between 0.375 and 30,000, and preferably between 4 and 500 for automobile radiator heat exchange wall member stamping applications.

Figure 16:
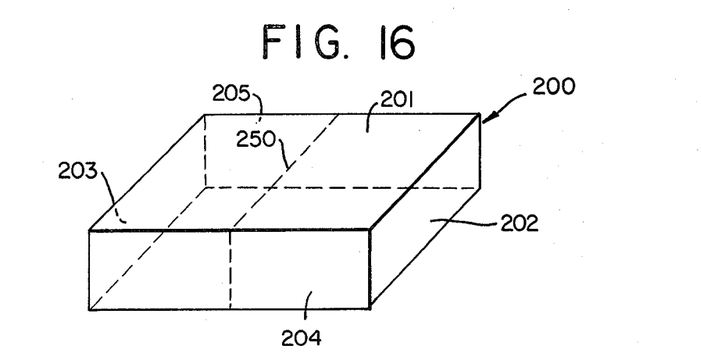
FIG. 16 is an isometric view of a metal workpiece for manufacturer of a die according to another embodiment of the invention.
Figure 17:
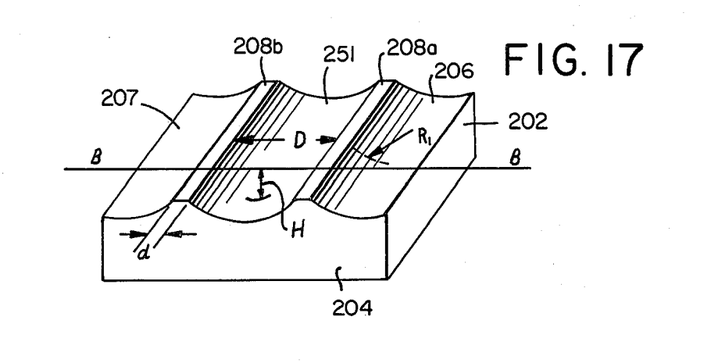
FIG. 17 is an isometric view of the FIG. 16 workpiece, after the same has been subjected to an initial forming step to form depressions in the workpiece top surface.
Figure 18:
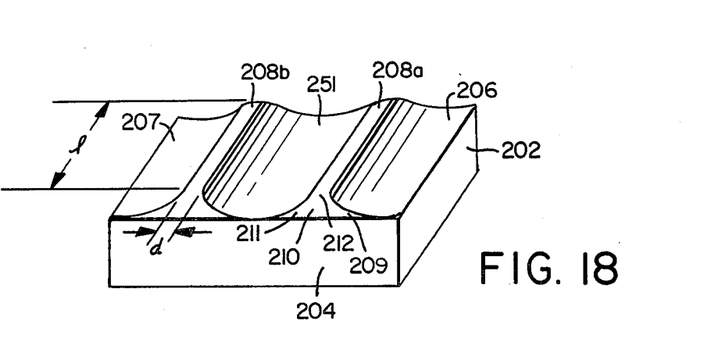
FIG. 18 is an isometric view of the FIG. 17 workpiece, after the same has been subjected to a second forming step to form smoothly contoured edge surfaces thereon.

FIGS. 16–18 show a metal workpiece and the subsequent forming steps, performed in an analogous manner to those described in connection with FIGS. 1–3 herein, as employed to provide the die workpiece with a plurality of flat top surface portions separated by interposed depressions. FIG. 16 shows a metal block workpiece 200 which may be of steel, aluminum or other suitable metal. The workpiece has a horizontally extending flat top surface 201, vertically extending side surfaces 202 and 203, and vertically extending front and back surfaces 204 and 205, respectively. Each of the side surfaces 202 and 203 is parallel to the other side surface and is perpendicular to the front and back surfaces, whereby the workpiece has a rectangular cross section in plan view (looking down on the horizontal top surface 201) over its entire vertical extent. Relative to the metal workpiece shown in FIG. 1, the FIG. 16 workpiece has a width or transverse extent which is about twice that of the FIG. 1 workpiece. The workpiece is shown with an imaginary dotted line 250 showing the demarcation of the workpiece into two sections, each geometrically similar to the workpiece of FIG. 1. As shown subsequently, each of the right-hand and left-hand sections of the die workpiece is formed symmetrically with respect to the other section, so that the imaginary line 250 represents a demarcation of a repeating unit of the die top surface profile.

As shown in FIG. 17, depressions 206, 207 and 251 have been formed in the workpiece, with these depressions extending across the flat top surface from the front surface to the back surface parallel to the side surfaces of the workpiece. Adjacent depressions are spaced apart from one another to retain flat top surface portions 208a and 208b therebetween of rectangular shape having a transverse dimension d as measured in a horizontal plane containing the flat top surface portions. The depressions are formed with a concave elevational contour of constant radius of curvature $R_1$ as viewed in a vertical plane perpendicular to the side surfaces of the workpiece. The forming step is carried out such that the dimensional ratio of the radius of curvature $R_1$ to the flat top surface portion transverse dimension d is between 0.375 and 30,000, and preferably 4 and 500, as discussed previously. The depression forming step is carried out such that the relationship between the depression radius of curvature $R_1$ flat top surface portion tranverse dimension d, depression depth H and flat top surface portion spacing d is defined by $$R_1 = \frac{(D-d)^2}{8H} + \frac{H}{2}$$

wherein H is the maximum height measured perpendicularly from a horizontal plane containing the flat top surface portions (and reference line B-B as shown in FIG. 17) to the innermost point of the elevational contour of a depression between adjacent flat top surface portions, and D is the center-to-center spacing between adjacent flat top surface portions, as measured in a vertical plane perpendicular to the workpiece side surfaces.

FIG. 18 shows the workpiece of FIG. 17, after the latter has been subjected to a second forming step of forming smoothly contoured edge surfaces 209 on the workpiece in the regions of intersection of the top surface of the workpiece with the front and back surfaces thereof, including edge surface portions 210 extending between and joining the front and back surfaces with the flat top surface portions 208a, 208b each having an inwardly directed elevational contour from a lower extremity adjacent the front or back surface to an upper extremity 212 adjacent the flat top surface portion, as viewed in a vertical plane perpendicular to the side surfaces of the workpiece and passing through the flat top surface portion. After such forming step, the flat top surface portion has a longitudinal dimension 1 which is desirably at least ten times the value of the transverse dimension d of the flat top surface portion and, as indicated previously, the longitudinal dimension 1 should be at least 50% and preferably at least 75% of the longitudinal dimension of the die workpiece.

The contoured metal die shown in FIG. 18 thus has a top surface comprising ridge projections extending elongately across the top surface parallel to the side surfaces of the die with flat top surface portions at the extremities of the ridge projections, and with the flat top surface portions being surrounded by top surface portions having a concave elevational contour as provided by the machined depressions 206, 207 and 251.

Figure 19:
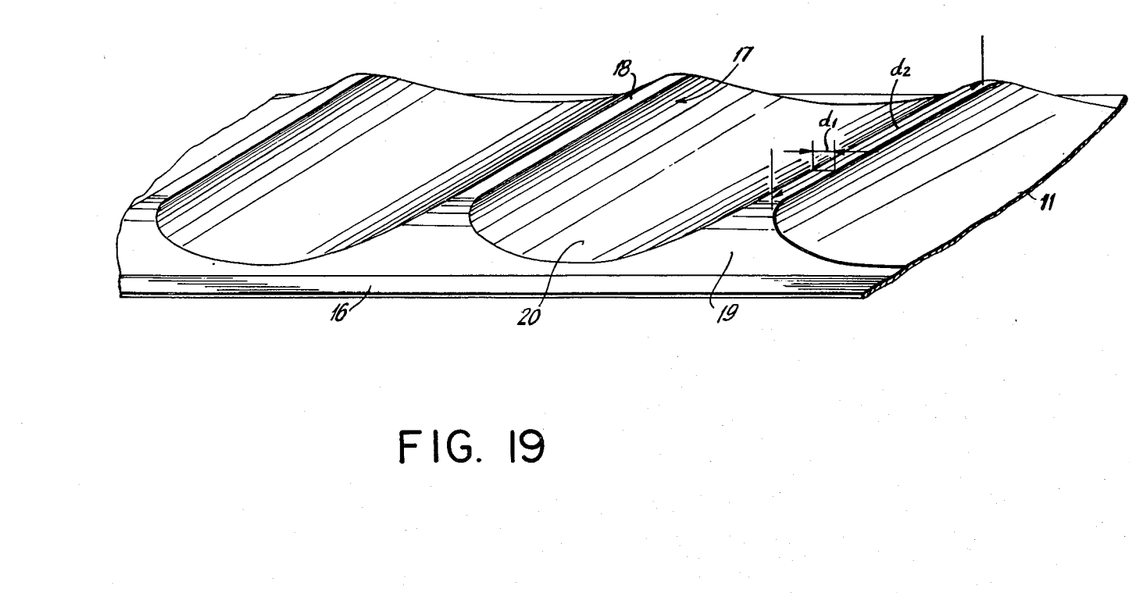
FIG. 19 is an isometric view of a portion of a heat exchange wall member stamped from thin sheet metal using the contoured die of the invention.

FIG. 19 is an isometric view of a portion of a heat exchange wall member stamped from thin sheet metal using the die of this invention. The wall member 11 is thus stamped with a surface comprising ridge projections 17 extending elongately across the top surface with flat top surface portions 18 at the extremities of the ridge projection, the flat top surface portions 18 having an aspect ratio ($d_2/d_1$) of at least 10, wherein $d_2$ is the longitudinal dimension of the ridge projection flat top surface portion and $d_1$ is the transverse dimension of the ridge projection flat top surface portion. The flat top surface portions are surrounded by top surface portions 20 having a concave elevational contour. Edge surface portions 19 are formed between the unstamped margins 16 of the wall member and the aforementioned flat top surface and concave surface portions of the wall member.

Figures 20, 21, 22:
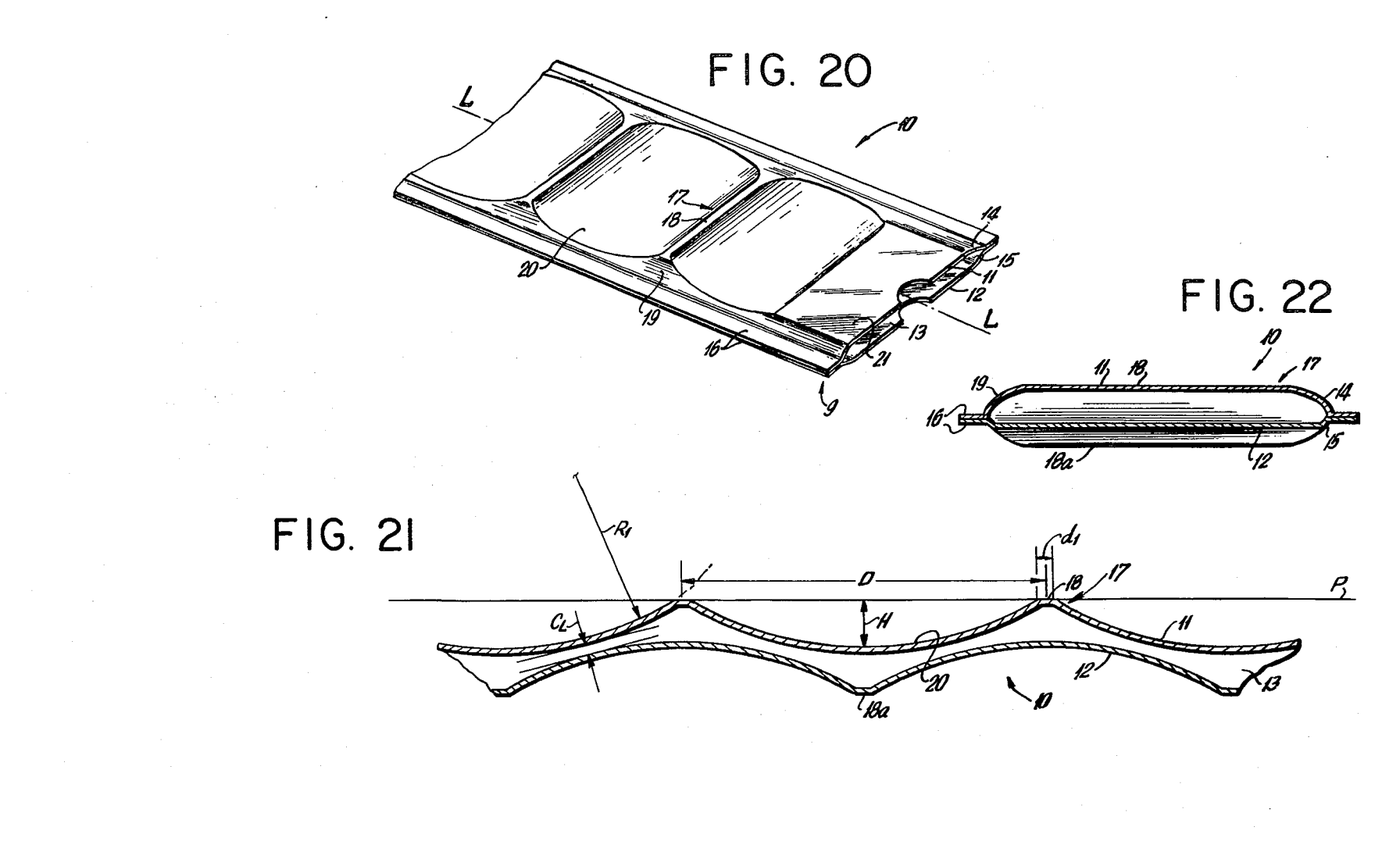
FIG. 20 is an isometric view of a portion of a heat exchange channel element constructed from wall members of the type shown in FIG. 19.
FIG. 21 is a sectional elevational view of a portion of the FIG. 20 channel element along the longitudinal axis L-L thereof.
FIG. 22 is a sectional, elevational view of the FIG. 20 channel element, taken in cross-section along a wall projection portion thereof.

FIG. 20 shows an isometric view of a channel element formed from wall members of the type shown in FIG. 19. The heat exchange channel element 10 includes two spaced-apart wall members 11 and 12 of thermally conductive material bounding a fluid flow channel 13. A multiplicity of ridge projection portions 17 are distributed across the wall member surface with flat loadbearing end segments 18 at their extremities, whereby the channel element may be supported abuttingly against an adjacent structural member by the load-bearing end segments of the wall projection portions.

The two spaced-apart wall members 11 and 12 of the FIG. 20 channel element constitute side walls of the channel element. These side walls are spaced apart by edge walls comprising edge wall portions 14 and 15. In practice, the edge walls of the channel element may be formed separately from the side walls and joined to the latter as for example by braising or welding to form the completed channel element, however, it is more advantageous in general to form upper and lower halves of the channel element from unitary sheets of material as shown more clearly in FIG. 22, so that the upper half of the channel element comprises side wall member 11, edge wall portion 14 and flange-like margins 16, and with the lower half of the channel element being similarly formed. With such integral side and edge wall construction, the upper and lower channel element halves may be joined to one another by welding, brazing, adhesive bonding or other suitable joining method along the mating surfaces of the margins 16.

The side walls and edge walls of the FIG. 20 channel element may suitably have a thickness of between about 0.003 and 0.25 inch. In preferred practice, the side walls and edge walls are formed of aluminum, as suitably employed in automobile radiator applications, and the walls desirably have a thickness of between about 0.003 and 0.100 inch.

As shown in FIG. 20, the channel element is formed in such manner that the wall projection portions 17 are provided in the form of ridges extending across substantially the full width of the side wall 11, with the wall member surface 20 between adjacent wall projection portions being concavely curved. In such configuration, the wall projection portions 17 extend elongately on the wall member surface with the load-bearing segments 18 thereof having major axes which are substantially perpendicular to the longitudinal axis L-L of the channel element. The load-bearing end segments 18 of the wall projection portions 17 intersect the edge wall portions 14, 15 of the channel element at edge wall surfaces 19, which preferably are convexly contoured as shown in FIG. 22 to decrease hydrodynamic drag and pressure drop when a second heat exchange medium is flowed over the external surfaces of the channel element, from left to right as shown in FIG. 22, in heat exchange with a first heat exchange medium flowing through the channel element interior flow channel 13.

The illustratively shown channel element in FIG. 20 is a portion of a longitudinally extending element having its unillustrated extremity formed in the same manner as the extremity shown. Each extremity is provided with an end section 9 having flat side wall end portions 21. By such configuration, the channel elements may be stacked in an array of such elements to form a heat exchanger core, with the side wall end portions 21 of adjacent channel elements mating abuttingly with one another.

FIG. 21 shows a sectional, elevational view of a portion of the FIG. 20 heat exchange channel element along the longitudinal axis L-L. The features of the channel element in FIG. 21 are numbered correspondingly with respect to FIG. 20. As shown in FIG. 21, the upper and lower wall members 11 and 12 of the channel element 10 are similarly formed with a concavely contoured wall surface between adjacent wall projection portions and with the upper and lower wall members 11 and 12 oriented with respect to one another so that the innermost point on the wall surface between adjacent wall projection portions of one wall member is vertically aligned with a load-bearing end segment of a wall projection portion of the other wall member. Thus, for example, the innermost point on the wall surface 20 of upper wall member 11 is vertically aligned with the load-bearing end segment 18a of lower wall member 12.

FIG. 21 shows the geometric and dimensional characteristics of the channel element. As indicated above, the wall surface between adjacent wall projection portions is concavely curved; specifically, the elevational contour of such wall surface is concavely circular, i.e., the surface in elevation has a uniform radius of curvature $R_1$ between the load-bearing end segments of adjacent wall projection portions. The relative "depth" of the depression between adjacent wall projection portions is measured with reference to the base plane P of the wall member, which is a plane containing the extremities of wall surface projections. The load-bearing end segments are flat and horizontally aligned as shown, so that the load-bearing end segments in this embodiment lie fully in the base plane P of the wall member.

The remaining dimensional parameters in FIG. 21 are measured by reference to the above-described base plane of the wall member. The dimension H provides a measure of the "depth" of the concavely contoured surface between adjacent wall projections and is the maximum height measured perpendicular from the base plane P of the wall member to the innermost point (i.e., the furthest point from the base plane) on the wall member surface between adjacent wall surface projections. The dimension $d_1$ is the length of the minor axis of the wall projection portion load-bearing end segment measured in the base plane of the wall member. The length of the load-bearing end segment minor axis is simply the measured lateral dimension of the load-bearing end segment and this dimension is uniform across the width of the channel element along which the load-bearing end segment elongately extends. The characteristic dimension of the load-bearing end segment in the direction of elongation of the associated wall projection portion (not shown in FIG. 21) is the major axis of the load-bearing end segment. The D dimension is the center-to-center spacing between the load-bearing end segments of adjacent wall projection portions, as measured in the base plane of the wall member. The minimum channel clearance for the channel element is shown as dimension $C_L$.

FIG. 22 is a sectional elevational view of the FIG. 20 channel element taken in cross section at a wall projection portion 17 of the upper wall member 11. As shown, the channel element has an elongated cross-section bound by the two spaced-apart wall members 11 and 12 as side walls spaced apart by edge walls formed by edge wall portions 14 and 15. The channel element is formed from corresponding upper and lower distinct integral halves which are bonded together along the facing surfaces of peripheral flange-like margins 16. As indicated hereinabove, the upper and lower channel element halves may be bonded at their margins by soldering, brazing, welding, adhesive bonding or other suitable joining technique. The surface 19 of edge wall portion 14 adjacent the wall projection 17 has an elevational contour of convex shape. Alternatively, edge wall surface 19 could be provided with a straight or concave contour. Nonetheless, the convex contour shown is generally preferred in practice, inasmuch as it allows the edge walls in the region of the wall projection portions to accommodate higher internal pressures than can be tolerated with linear or concave contours of the edge wall surface 19. Furthermore, the convex edge wall surface 19 greatly reduces the frictional drag that would otherwise be associated with a blunt edge wall.

Although preferred embodiments of this invention have been described in detail, it is contemplated that modification thereof may be made and some features may be employed without others, all within the spirit and scope of the invention.

I claim:

1. A contoured metal die suitable for stamping heat exchange channel element wall members from thin sheet metal, of block-like form having vertically extending side surfaces and vertically extending front and back surfaces, with each of said side surfaces being parallel to the other side surface and perpendicular to said front and back surfaces, whereby said die has a rectangular cross-section in plan view over its entire vertical extent, with a top surface comprising ridge projections extending elongately across said top surface parallel to said side surfaces of said die with flat top surface portions at the extremities of said ridge projections, said flat top surface portions having an aspect ratio $(d_2/d_1)$ of at least 10, wherein $d_2$ is the longitudinal dimension of the ridge projection flat top surface portion as measured in a horizontal plane containing said flat top surface portions and $d_1$ is the transverse dimension of the ridge projection flat top surface portion as measured in said horizontal plane containing said flat top surface portions along a direction perpendicular to said side surfaces of said die, with said flat top surface portions being surrounded by top surface portions having a concave elevational contour of constant radius of curvature $R_1$ as viewed in a vertical plane perpendicular to said side surfaces of said die, such that the dimensional ratio of said radius of curvature $R_1$ to the flat top surface portion transverse dimension d is between 0.375 and 30,000, and with said ridge projections having smoothly contoured edge surfaces between said top surface of said die and the front and back surfaces thereof, including edge surface portions extending between and joining said front and back surfaces with said flat top surface portions, said edge surface portions each having an inwardly directed elevational contour from a lower extremity adjacent said front or back surface to an upper extremity adjacent said flat top surface portion, as viewed in a vertical plane parallel to said side surfaces of said die and passing through the flat top surface portion.

2. A die element according to claim 1 having only a single flat top surface portion surrounded on either side by concave top surface portions whose elevational contours terminate at said side surfaces of said die such that a tangent to the elevational contour at its outermost extremity is perpendicular to the associated side surface.

3. A composite die comprising a plurality of die elements according to claim 2, wherein said die elements are disposed in a longitudinally extending ray of sequential die elements, oriented with their front and back surfaces in alignment and with abutment of facing side surfaces of adjacent die element, with fixture means retaining said array of sequential die elements in position to provide a longitudinally undulating top die surface of ridges formed by the flat top surface portions of said die elements and interposed valleys formed by mating concave top surface portions of adjacent die elements.

4. A die according to claim 1 with a top surface comprising a plurality of flat top surface portions separated by interposed concave top surface portions.

5. A die according to claim 3 or 4 wherein the die top surface is characterized by a relationship between the concave top surface portion radius curvature $R_1$, flat top surface portion transverse d, concave top surface portion depth H, and flat top surface portion spacing D defined by $$R_1 = \frac{(D-d)^2}{8H} + \frac{H}{2}$$

wherein H is the maximum height measured perpendicularly from a horizontal plane containing said flat top surface portions to the innermost point on the elevational contour of the concave top surface portion between adjacent flat top surface portion, and D is the center-two-center spacing between adjacent flat top surface portions, as measured in a vertical plane perpendicular to the die side surfaces.

6. A die according to claim 5 wherein: H is between about 0.035 and 0.80 inch: D is between about 0.4 and 1.1 inch; and d is about 0.01 and 0.05 inch.

7. A die according to claim 1 wherein said edge surface portions have a continuously curving convex elevational contour.

8. A die according to claim 1 wherein said edge surface portions have a continuously curving concave elevational contour.

9. A die according to claim 1 wherein said edge portions have a linear elevational contour.

10. A die according to claim 1 wherein the edges at the intersection of the flat top surface portions and the concave top surface portions have a smoothly convexly curved elevational contour as viewed in a vertical plane perpendicular to said side surfaces of said die.

11. A die according to claim 5 wherein: D is between about 0.2 and 3.0 inch; H/D is between about 0.05 and 0.5; and D/d is between about 1.5 and 50.

12. A die according to claim 1 wherein the longitudinal dimension of the flat top surface portions is at least 50% of the longitudinal dimensions of said die.

13. A die according to claim 1 wherein said edge surface portions of said contoured edge surfaces of said die have a continuously curved convex elevational contour, with the lower extremity of the edge surface portion adjacent said front or back surface of said die being tangent to said front or back surface and with the upper extremity of said edge surface portion adjacent said flat top surface portion being tangent to said flat top surface portion.

14. A die according to claim 1 wherein the ratio $R_1/d$ is between 4 and 500.

* * * * *